US009764672B1

(12) United States Patent
Ohno et al.

(10) Patent No.: US 9,764,672 B1
(45) Date of Patent: Sep. 19, 2017

(54) TRANSPORTATION VEHICLE

(71) Applicant: Hitachi Construction Machinery Co., Ltd., Tokyo (JP)

(72) Inventors: Akira Ohno, Tsuchiura (JP); Hirokazu Shimomura, Tsuchiura (JP); Toshikazu Minoshima, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 15/409,571

(22) Filed: Jan. 19, 2017

(30) Foreign Application Priority Data

Mar. 14, 2016 (JP) .................................. 2016-050300

(51) Int. Cl.
*B60P 1/16* (2006.01)
*B60P 1/22* (2006.01)

(52) U.S. Cl.
CPC .. *B60P 1/22* (2013.01); *B60P 1/16* (2013.01)

(58) Field of Classification Search
CPC .................................. B60P 1/22; B60P 1/16
USPC ..................... 298/22 R, 22 P, 22 C; 180/271; 254/93 VA
See application file for complete search history.

(56) References Cited

U.S. PATENT DOCUMENTS 8,328,291 B2 * 12/2012 Nakate ................... B60P 1/283
298/22 C
2009/0102273 A1 * 4/2009 Kaneko .................. B60P 1/162
298/22 C

FOREIGN PATENT DOCUMENTS

WO 2008-099691 A1 8/2008

\* cited by examiner

*Primary Examiner* — Stephen Gordon
(74) *Attorney, Agent, or Firm* — Mattingly & Malur, PC

(57) ABSTRACT

An object is to restrain a hoist shaft and a bushing of a hoist cylinder from abrading. A haulage vehicle with a pivoting vessel has a telescoping hoist cylinder provided between the vessel and the vehicle. Supply of hydraulic oil to the hoist cylinder is controlled by a valve provided between the hydraulic power source and the hoist cylinder. The haulage vehicle is provided with a bushing at one end portion of the hoist cylinder; a hoist shaft is mounted in a through bore of the bushing; a lubricant supplier supplies lubricant to a clearance between a surface of the hoist shaft and an internal surface of the through bore of the bushing; and when the vessel is seated on the vehicle, a controller controls the valve to make the hoist cylinder contract and also supply lubricant to the clearance.

5 Claims, 10 Drawing Sheets

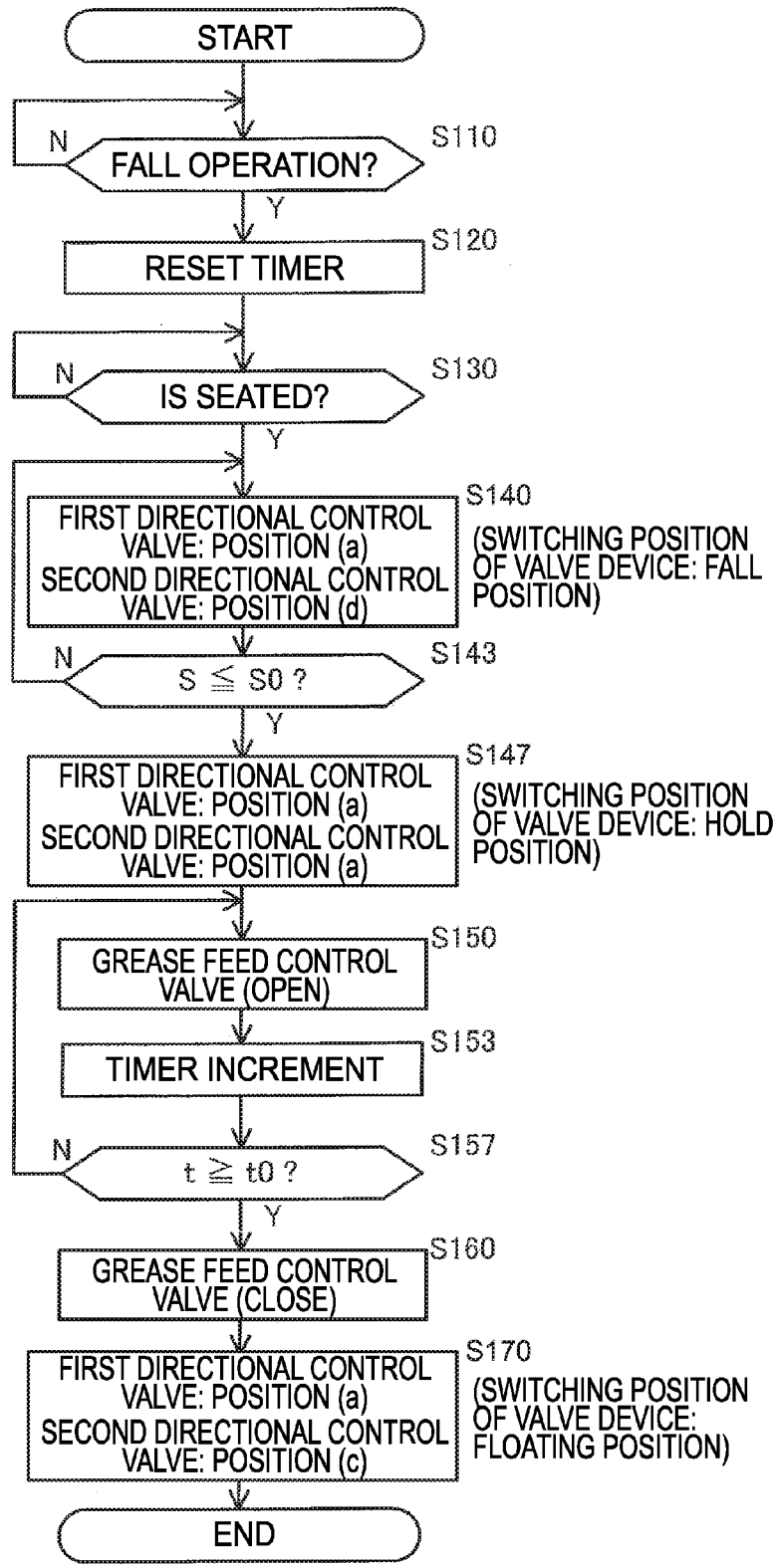

TRANSPORTATION VEHICLE

BACKGROUND

1. Field of the Invention

The present invention relates to a haulage vehicle.

2. Description of the Related Art

There has been known a dump truck with a vessel provided to be able to rise and fall on a vehicle. The dump truck transports a large amount of transportation objects such as crushed rocks, earth, sand and so on loaded in the vessel. The dump truck is provided with a hoist cylinder that is telescopically provided between the vessel and the vehicle and that extends to tilt the vessel when discharging the transportation objects from the vessel, as described in International Application Publication No. WO2008/099691.

The hoist cylinder is connected at its lower end with a hoist shaft provided in the vehicle and is connected at its upper end with the vessel by means of a pin. The hoist cylinder has a rod head disposed at its lower end, the rod head is provided with a bore through which the hoist shaft passes, and a cylindrical bushing is arranged in the bore.

The hoist shaft is mounted on the rod head through the cylindrical bushing. The inside diameter of the bushing provided on the rod head is set to be smaller slightly than the outside diameter of the hoist shaft.

The hoist shaft supports the dead weight of those including the vessel and the hoist cylinder. That is, the hoist shaft supports the load directed downward (toward the ground under the vehicle). In this state, a tight contact is held between an internal surface upper part of the bushing and a surface upper part of the hoist shaft, and this gives rise to a problem that it is unable to supply lubricant to the tight contact portion between the hoist shaft and the bushing and hence, that the upper parts of the hoist shaft and the bushing abrade easier than other parts thereof.

SUMMARY

In one aspect of the present invention, there is provided with a haulage vehicle, which is provided with: a vessel pivotably provided relative to a vehicle; a hoist cylinder provided telescopically between the vessel and the vehicle; a hydraulic power source that supplies the host cylinder with hydraulic oil; and a valve provided between the hydraulic power source and the hoist cylinder for controlling the flow of hydraulic oil supplied to the hoist cylinder, wherein the haulage vehicle is further provided with: a bushing provided at one end portion of the hoist cylinder; a hoist shaft provided in the vehicle and mounted in a through bore of the bushing; a lubricant supplier that supplies lubricant to a clearance between a surface of the hoist shaft and an internal surface of the through bore of the bushing; a seating detection device that detects whether the vessel is seated on the vehicle or not; and a controller that when the vessel is seated on the vehicle, controls the valve to make the hoist cylinder contract and also controls the lubricant supplier to supply lubricant to the clearance.

According to the present invention, it is possible to restrain the hoist shaft and the bushing of the hoist cylinder from abrading, so that the hoist shaft and the bushing can be extended in service life.

BRIEF DESCRIPTION OF THE DRAWINGS

A non-limiting and non-exhaustive embodiment of the present invention will be described with reference to the following drawings, wherein like reference signs refer to like parts throughout various views unless otherwise specified.

FIG. 10 is a flowchart showing the processing details of a lubricant supply control by a controller according to the present embodiment.

DETAILED DESCRIPTION

Figure 1:
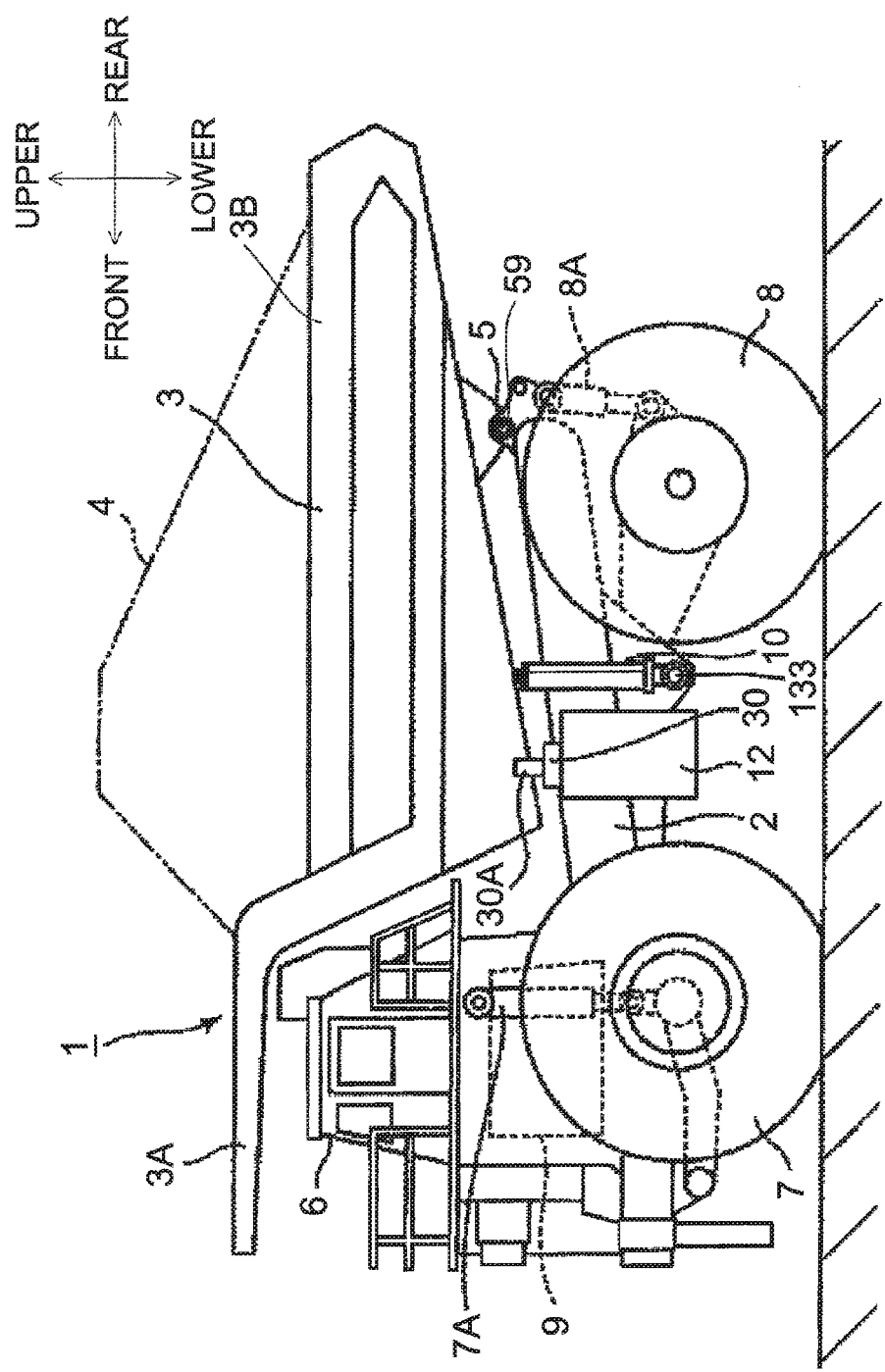
FIG. 1 is a side view of a dump truck according to one embodiment of the present invention.
Figure 2:
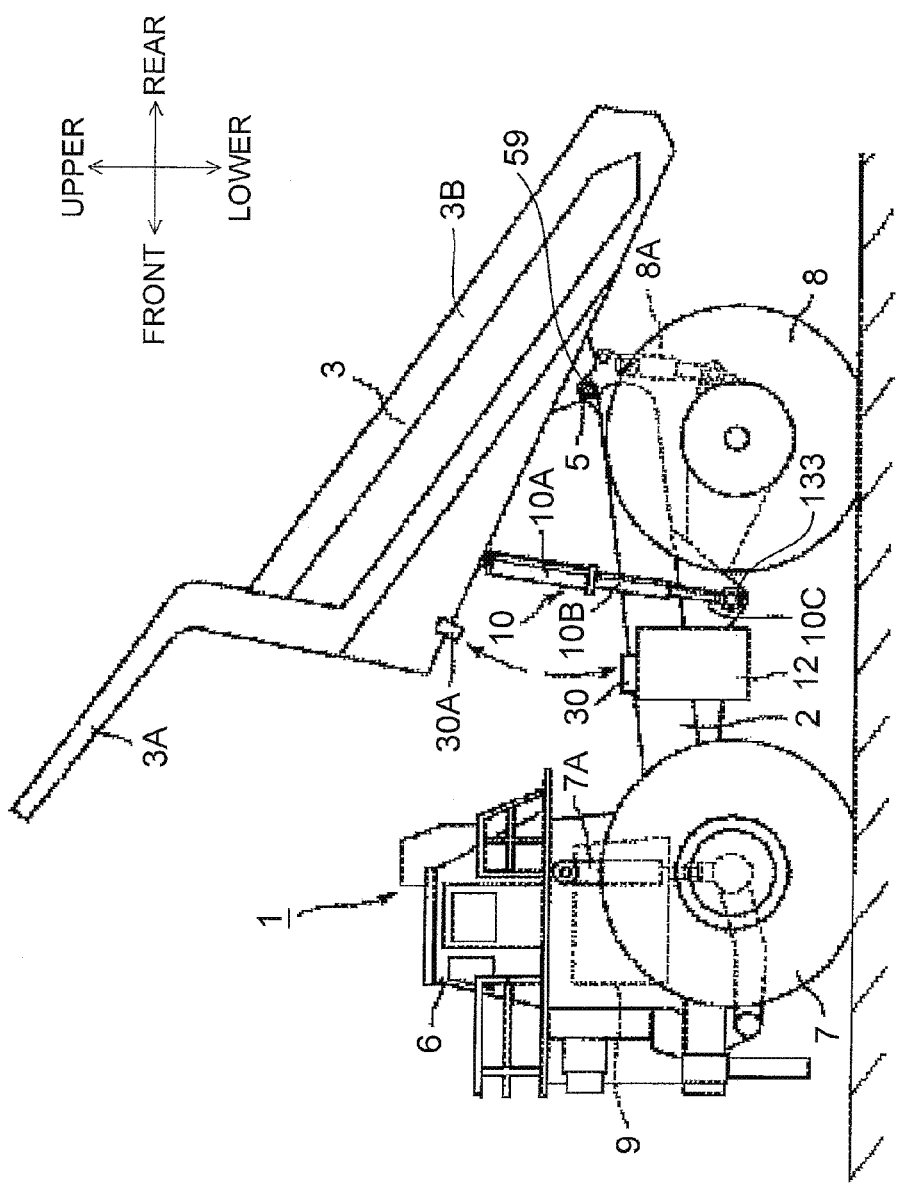
FIG. 2 is a side view of the dump truck with a vessel tilted obliquely rearward.

Hereafter, with reference to the drawings, one embodiment of a haulage vehicle according to the present invention will be described by taking as example a heavy-duty dump truck that transports crushed rocks and the like mined in mines and the like. FIG. 1 is a side view (as viewed from left side of the vehicle) of a dump truck 1 according to one embodiment of the present invention. FIG. 2 is a side view (as viewed from left side of the vehicle) of the dump truck 1 with a vessel 3 tilted obliquely rearward. For convenience in description, the front-rear direction and the upper-lower (upward-downward) direction are prescribed as indicated in these figures.

As shown in FIG. 1 and FIG. 2, the dump truck 1 is provided with a self-propellable vehicle, the vessel 3 as a loading platform that is provided to be able to rise and fall (i.e., to be pivotable) on a vehicle frame 2 constituting the vehicle, a cab (driver's cab) 6 provided at the front part of the vehicle frame 2, and hoist cylinders 10 that pivotably move the vessel 3 (i.e., that make the vessel 3 rise or fall) in the upward-downward direction.

The vessel 3 is formed as, for example, a giant-sized container of 10-13 meters long in entire length for loading thereon a large amount of heavy transportation objects such as crushed rocks and the like (hereafter referred to as crushed rocks 4). The vessel 3 is integrally provided with a container section 3B for containing the crushed rocks 4 and a canopy section 3A which is provided at the front side of the container section 3B and which covers the upper part of the cab 6 to protect the cab 6 from scattering rocks.

A bottom part on the rear side of the vessel 3 is coupled with the vehicle frame 2 to be pivotable (to be able to rise and fall) relative to the vehicle frame 2 through a connecting pin 5 provided in the vicinity of the rear end of the vehicle frame 2. When the hoist cylinders 10 expand or contract, the vessel 3 rises or falls so that the canopy section 3A on the front side of the vessel 3 pivots in the upward-downward about the connecting pin 5 serving as a fulcrum. The vessel 3 is pivoted between a transportation position shown in FIG. 1 and a dumping position shown in FIG. 2. When the hoist cylinders 10 expand to make the vessel 3 pivot toward the dumping position, the crushed rocks 4 loaded in the vessel 3 are discharged to a predetermined pickup/collection point as they slip down from the vessel 3 that is tilted obliquely rearward to have the rear side positioned below the front side as shown in FIG. 2. When being at the transportation position as shown in FIG. 1, the vessel 3 is held in the seated state with the bottom portion on the front side of the container section 3B seated on a chassis table (not shown) of the vehicle frame 2.

In the cab 6, there are provided a driver's seat on which an operator is seated, a starter switch for starting an engine 9, an acceleration pedal for causing the vehicle to travel, a brake pedal for giving the vehicle a brake force, a steering handle for steering operation (all not shown) and an operating lever device 28 (refer to FIG. 4) for making the vessel 3 to rise or fall.

The dump truck 1 is provided with front wheels 7 and rear wheels 8. The front wheels 7 constitute steered wheels which are steerable (can be given a steering operation) by the operator of the dump truck 1. Between the front part of the vehicle frame 2 and the front wheels 7, there are provided front wheel side suspensions 7A constituted by hydraulic shock absorbers, and the front part side of the vehicle frame 2 is supported by the front wheel side suspensions 7A.

The rear wheels 8 constitute drive wheels of the dump truck 1 and are rotationally driven by a traveling drive device (not shown). Between the rear wheels 8 and the rear part of the vehicle frame 2, there are provide rear wheel side suspensions 8A constituted by hydraulic shock absorbers and the like, so that the rear part side of the vehicle frame 2 is supported by the rear wheel side suspensions 8A. The outside diameter of the front wheels 7 and the rear wheels 8 is up to the range of 2 to 4 meters.

Inside the vehicle frame 2 under the cab 6, the engine 9 is provided as a prime mover. The engine 9 is constituted by, for example, a large-sized diesel engine and the like.

Between the vehicle frame 2 and the vessel 3, a pair of the hoist cylinders 10 (the hoist cylinder on the left side only is shown in FIG. 1) are provided telescopically. Each hoist cylinder 10 is a hydraulic cylinder of a multistage type (e.g., a two-stage type).

Figure 3:
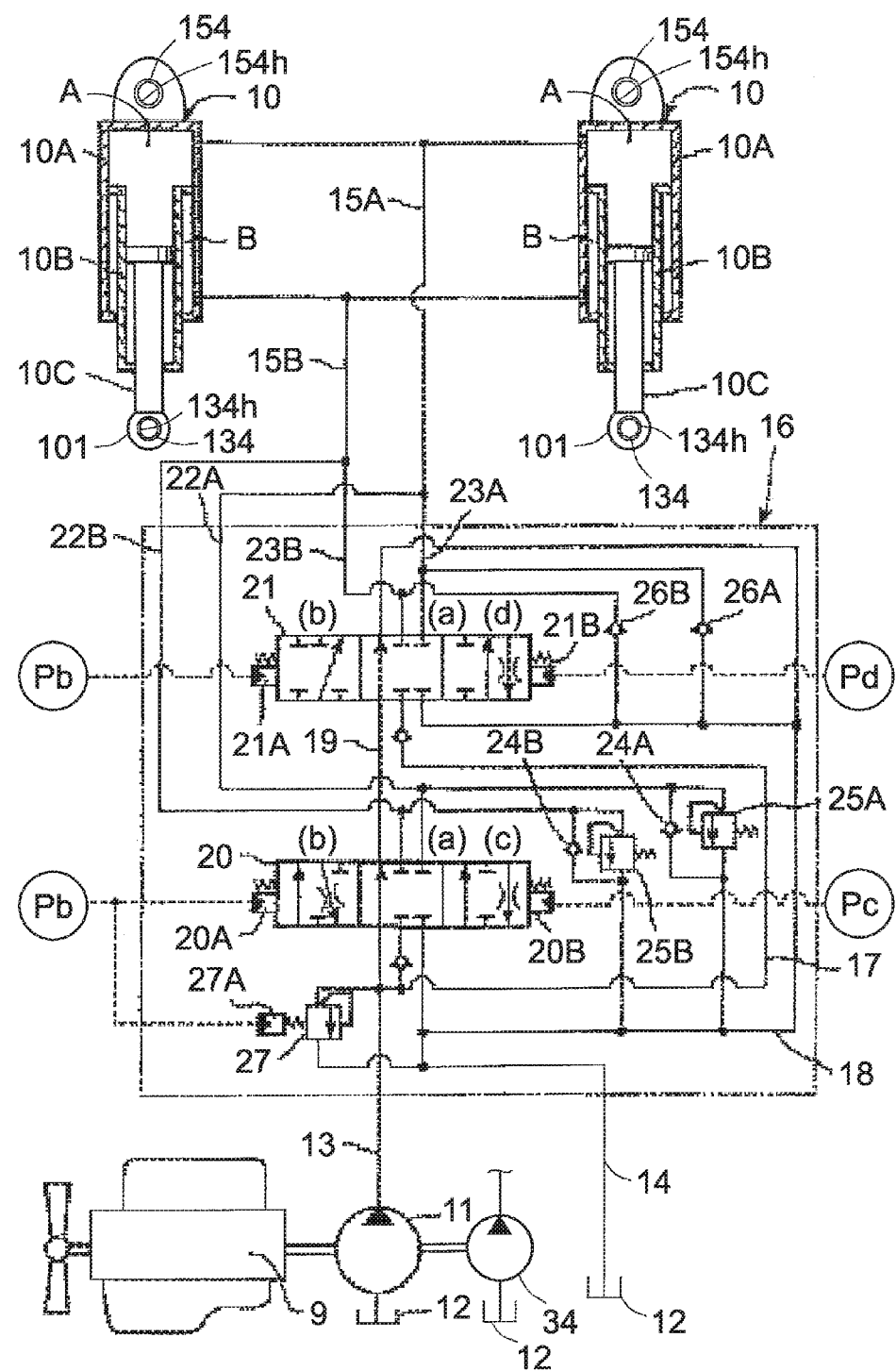
FIG. 3 is a hydraulic circuit diagram for driving a hoist cylinder.

FIG. 3 shows a hydraulic circuit diagram for driving the hoist cylinders 10. The hoist cylinders 10 are paired to have the same configuration. As shown in FIG. 3, the hoist cylinders 10 are each provided with a cylindrical outer tube portion 10A, a cylindrical inner tube portion 10B provided telescopically inside the outer tube portion 10A and partitioning the interior of the outer tube portion 10A into an upper side oil chamber A and a lower side oil chamber B, and a piston rod 10C provided telescopically in the interior of the inner tube portion 10B. As mentioned, the pair of the hoist cylinders 10 are identical in its configuration and operation as well as in connection relation with the hydraulic circuit shown in FIG. 3. Therefore, as a matter of convenience, the following description will be directed typically to one only of the hoist cylinders 10 unless otherwise specified to the contrary, and such description directed to one hoist cylinder 10 will be equally applied to the other hoist cylinder 10.

The hoist cylinder 10 extends the piston rod 10C when supplied at the oil chamber A with hydraulic oil from the main pump 11 and when discharging hydraulic oil from the oil chamber B, and makes the piston rod 10C contract when supplied at the oil chamber B with hydraulic oil from the main pump 11 and when discharging hydraulic oil from the oil chamber A. When the hoist cylinder 10 extends, the vessel 3 is pivoted about the connecting pin 5 severing as a fulcrum toward the dumping position (refer to FIG. 2). When the hoist cylinder 10 contracts, the vessel 3 is pivoted about the connecting pin 5 severing as the fulcrum toward the transportation position (refer to FIG. 1).

The vehicle frame 2 is provided with a hoist shaft 133 being a cylindrical member extending horizontally in the right-left direction (refer to FIG. 1). As shown in FIG. 3, the hoist cylinder 10 is provided with a bore 102 (refer to FIG. 7A) at an extreme end portion of the piston rod 10c (hereafter referred to as "rod head 101"), and a cylindrical bushing 134 is press-fitted in this bore 102. The bushing 134 is provided with a through bore 134h into which the hoist shaft 133 is inserted. Likewise, a bore is provided at an upper end part of the outer tube portion 10A of the hoist cylinder 10, and a cylindrical bushing 154 is press-fitted in this bore. The bushing 154 is provided with a through bore 154h into which a vessel mounting pin (not shown) provided in a bracket (not shown) of the vessel 3 is inserted.

The hoist shaft 133 is mounted with itself inserted into the through bore 134h of the bushing 134 in the rod head 101 of the piston rod 10C. The vessel mounting pin (not shown) is mounted with itself inserted into the through bore 154h of the bushing 154 on the outer tube portion 10A. Like this, the hoist cylinder 10 is pivotably mounted to the vessel 3 at its one end part and is pivotably mounted to the vehicle frame 2 at the other end part and is able to extend and contract between the vessel 3 and the vehicle frame 2.

The engine 9 has an output shaft coupled with a main pump 11 and a pilot pump 34. The main pump 11 and the pilot pump 34 are rotationally driven by the engine 9, and are each a hydraulic pump that discharges hydraulic oil stored in a hydraulic oil reservoir 12.

The main pump 11 and the hydraulic oil reservoir 12 configure a hydraulic power source that supplies hydraulic oil to the hoist cylinder 10. The hydraulic oil reservoir 12 is located under the vessel 3 and is attached to a lateral surface of the vehicle frame 2 (refer to FIG. 1 and FIG. 2).

The hydraulic oil stored in the hydraulic oil reservoir 12 is discharged as pressurized oil from a discharge side of the main pump 11 into a high-pressure pump pipe conduit 13 when the main pump 11 is rotationally driven by the engine 9. Further, the return oil from the hoist cylinder 10 is discharged to the hydraulic oil reservoir 12 through a low-pressure reservoir pipe conduit 14.

The hoist cylinder 10 is connected with a hydraulic pipe conduit 15A at the oil chamber A and with a hydraulic pipe conduit 15B at the oil chamber B. The hydraulic pipe conduits 15A, 15B are connected to the main pump 11 and the hydraulic oil reservoir 12 constituting the hydraulic power source through the valve 16.

The valve 16 is provided between the hydraulic power source (i.e., the main pump 11 and the hydraulic oil reservoir 12) and the hoist cylinder 10. The valve 16, when switched in response to a pilot pressure from a pilot pressure generation device 33 (refer to FIG. 4) described later, controls the flow of the hydraulic oil supplied from the main pump 11 to the hoist cylinder 10 and the flow of the hydraulic oil discharged from the hoist cylinder 10 to the hydraulic oil reservoir 12. The valve 16 is provided with a high-pressure side oil passage 17, a low-pressure side oil passage 18, a bypass oil passage 19, a first directional control valve 20, and a second directional control valve 21. The first directional control valve 20 and the second directional control valve 21 are connected in parallel to each other through the high-pressure side oil passage 17 and the low-pressure side oil passage 18 and further, are in a tandem connection through the bypass oil passage 19.

The high-pressure side oil passage 17 is connected to the discharge side of the main pump 11 through the pump pipe conduit 13, while the low-pressure side oil passage 18 is connected to the hydraulic oil reservoir 12 through the reservoir pipe conduit 14. When the first directional control valve 20 and the second directional control valve 21 are both at a neutral position (a), the bypass oil passage 19 makes the high-pressure side oil passage 17 communicate with the low-pressure side oil passage 18 to bring the main pump 11 into an unloaded state, so that the discharge pressure (the pressure in the pump pipe conduit 13) is kept in a low-pressure state being close to the reservoir pressure.

The first directional control valve 20 is provided on the output side with a pair of actuator-side oil passages 22A, 22B. The actuator-side oil passages 22A, 22B are connected to the oil chambers A, B of the hoist cylinder 10 through the hydraulic pipe conduits 15A, 15B, respectively. The second directional control valve 21 is provided on the output side with a pair of actuator-side oil passages 23A, 23B. The actuator-side oil passages 23A, 23B are connected to the oil chambers A, B of the hoist cylinder 10 through the hydraulic pipe conduits 15A, 15B, respectively.

The first directional control valve 20 and the second directional control valve 21 are each a hydraulically piloted 6-port 3-position directional control valve. The first directional control valve 20 is provided with a pair of hydraulic pilot portions 20A, 20B. The first directional control valve 20 is switched from the neutral position (a) to a rise position (b) when supplied with a pilot pressure Pb at the hydraulic pilot portion 20A and is switched from the neutral position (a) to a floating position (c) when supplied with a pilot pressure Pc at the hydraulic pilot portion 20B. The second directional control valve 21 is provided with a pair of hydraulic pilot portions 21A, 21B. The second directional control valve 21 is switched from the neutral position (a) to a rise position (b) when supplied with the pilot pressure Pb at the hydraulic pilot portion 21A and is switched from the neutral position (a) to a fall position (d) when supplied with a pilot pressure Pd at the hydraulic pilot portion 21B. Description will later be made regarding the configuration of a pilot pressure generation device 33 that generates the pilot pressures Pb, Pc and Pd for switching the first directional control valve 20 and the second directional control valve 21.

As shown in FIG. 3, the valve 16 is provided with check valves 24A, 24B for makeup purpose that are arranged on the first directional control valve 20 side. The check valves 24A, 24B are provided between the actuator-side oil passages 22A, 22B and the low-pressure side oil passage 18 to detour the first directional control valve 20. The check valves 24A, 24B are non-return valves that allow the hydraulic oil in the hydraulic oil reservoir 12 to flow from the low-pressure side oil passage 18 through the actuator-side oil passages 22A, 22B and the hydraulic pipe conduits 15A, 15B to the oil chambers A, B of the hoist cylinder 10, but prevent the flow in the opposite direction. Thus, the oil chambers A, B of the hoist cylinder 10 are replenished with hydraulic oil and are prevented from becoming a negative pressure.

The valve 16 is provided with relief valves 25A, 25B for overload protection. The relief valves 25A, 25B are provided between the actuator-side oil passages 22A, 22B and the low-pressure side oil passage 18 to detour the first directional control valve 20. The relief valves 25A, 25B are connected in parallel relation with the check valves 24A, 24B. The relief valve 25A opens when an overload in the contract direction acts on the hoist cylinder 10, to release the excess pressure on the oil chamber A side. The relief valve 25B opens when an overload in the extension direction acts on the hoist cylinder 10, to release the excess pressure on the oil chamber B side.

The valve 16 is provided with check valves 26A, 26B for makeup purpose that are arranged on the second directional control valve 21 side. The check valves 26A, 26B are provided between the actuator-side oil passages 23A, 23B and the low-pressure side oil passage 18 to detour the second directional control valve 21. The check valves 26A, 26B are non-return valves that allow the hydraulic oil in the hydraulic oil reservoir 12 to flow from the low-pressure side oil passage 18 through the actuator-side oil passages 23A, 23B and the hydraulic pipe conduits 15A, 15B to the oil chambers A, B of the hoist cylinder 10, but prevent the flow in the opposite direction. Thus, the oil chambers A, B of the hoist cylinder 10 are replenished with hydraulic oil and are prevented from becoming a negative pressure.

The valve 16 is provided with a relief valve 27 arranged between the high-pressure side oil passage 17 and the low-pressure side oil passage 18. The relief valve 27 is a relief valve which is variable in relief set pressure and prescribes the maximum discharge pressure of the main pump 11. When a pressure exceeding the maximum discharge pressure is generated, the relief valve 27 releases the excess pressure to the hydraulic oil reservoir 12.

The relief valve 27 has a variable pressure setting portion 27A supplied with the pilot pressure Pb. When the pilot pressure Pb acts on the variable pressure setting portion 27A, the relief set pressure is switched to a high-pressure setting. On the contrary, when the supply of the pilot pressure Pb is stopped, the relief set pressure of the relief valve 27 is switched to a low-pressure setting.

Figure 4:
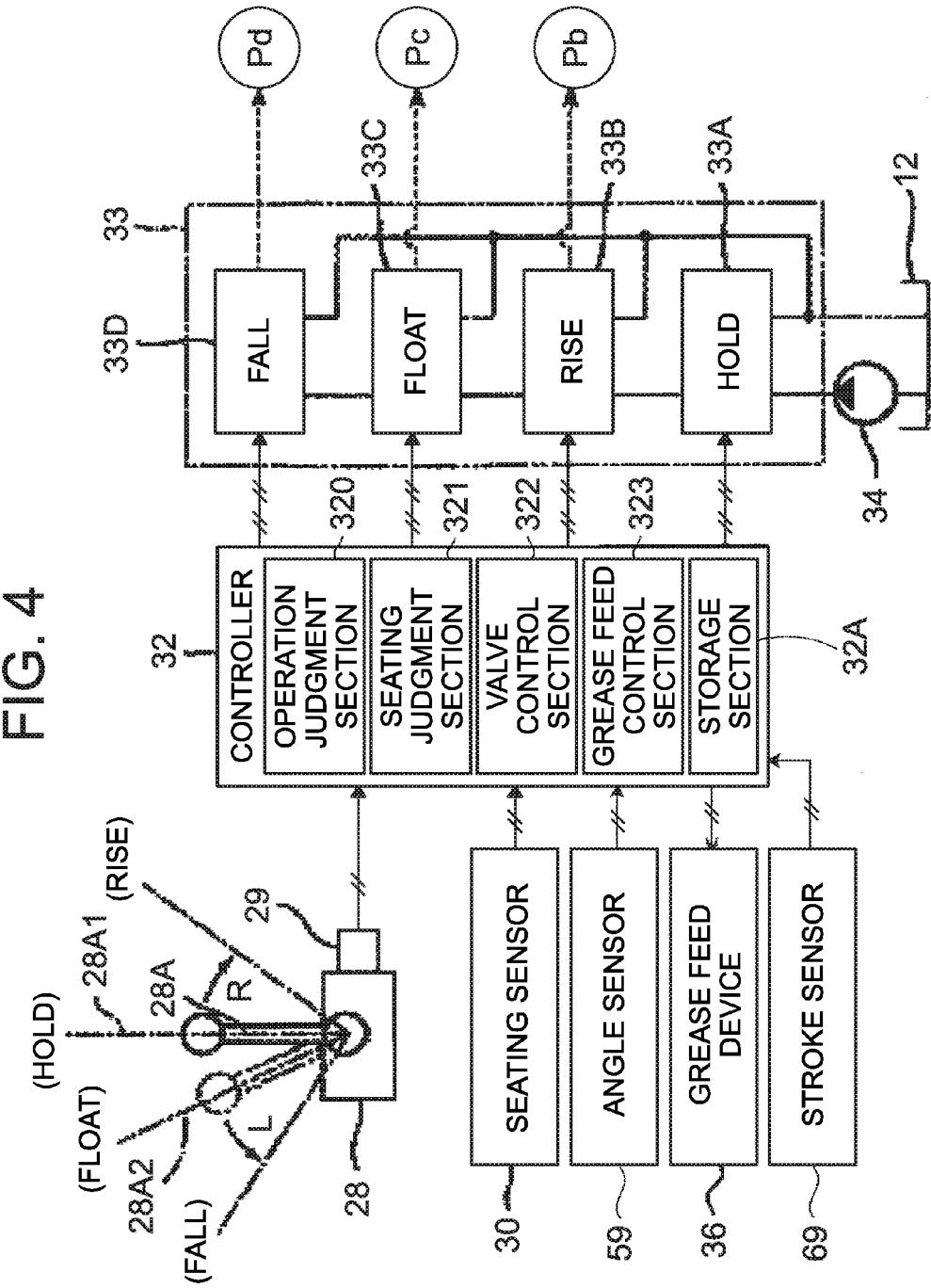
FIG. 4 is a control block diagram for the dump truck.

FIG. 4 is a control block diagram of the dump truck 1. As shown in FIG. 4, the dump truck 1 is provided with a controller (control device) 32, an operating lever device 28, a pilot pressure generation device 33, a grease feed device (lubricant supplier) 36, a seating sensor (seating detection device) 30, an angle sensor 59, and a stroke sensor 69.

The controller 32 is connected on the input side with detection devices such as a lever sensor 29, the seating sensor 30, the angle sensor 59, the stroke sensor 69 and the like and is connected on the output side with the pilot pressure generation device 33, the grease feed device 36 and the like. The controller 32 is configured to include an arithmetic processing device having a CPU, a storage section 32A such as a ROM, a RAM and the like, and other peripheral circuits and executes the control of the overall system of the dump truck 1.

The operating lever device 28 is operator means for operating the vessel 3 and is composed of, for example, an electric lever device. The operating lever device 28 has an operating lever 28A and the lever sensor 29 that detects the operating position of the operating lever 28A. The operating lever 28A is an operation member that the operator in the cab 6 pivotally operates by hand.

The operating lever 28A can take a hold position 28A1 indicated by the solid line in FIG. 4 and a floating position 28A2 indicated by the two-dot-chain line and usually takes the hold position 28A1. The hold position 28A1 is an operation position that makes the vessel 3 to be stopped and held at a desired position. When the operator releases the operating lever 28A from his/her hand in the state that the operating lever 28A is pivotally operated from the hold position 28A1 in the arrow R direction, the operating lever 28A is automatically returned by a first return spring (not shown) to the hold position 28A1. When the operator operates the operating lever 28A from the hold position 28A1 to the floating position 28A2, the operating lever 28A is self-held at the floating position 28A2 by a well-known detent mechanism (not shown). When the operator releases the operating lever 28A from his/her hand in the state that the operating lever 28A is pivotally operated from the floating position 28A2 in the arrow L direction, the operating lever 28A is automatically returned by a second return spring (not shown) to the floating position 28A2.

The lever sensor 29 detects the operation position of the operating lever 28A pivotally operated by the operator and outputs its detection signal to the controller 32. The controller 32 determines the switching position of the valve 16 in dependence on the operation position of the operating lever 28A and outputs a control signal corresponding to the switching position to the pilot pressure generation device 33.

The pilot pressure generation device 33 is, for example, an electric-hydraulic conversion device constituted by an electromagnetic proportional valve and converts control signals (electric signals) from the controller 32 into the pilot pressures (hydraulic signals) Pb, Pc and Pd. The pilot pressure generation device 33 is provided with four operation sections comprising a hold operation section 33A, a rise operation section 33B, a floating operation section 33C, and a fall operation section 33D.

The pilot pump 34 is rotationally driven by the engine 9 to supply the pilot pressure generation device 33 with pressurized oil of the degree ranging, for example, from 0.5 to 5.0 MPa (Mega-pascal). On the basis of the operation position of the operating lever 28A, the pilot pressure generation device 33 outputs the pressurized oil from the pilot pump 34 as the pilot pressures Pb, Pc and Pd to the valve 16 (refer to FIG. 3).

The controller 32 outputs a control signal to any one only at a time of the hold operation section 33A, the rise operation section 33B, the floating operation section 33C and the fall operation section 33D, during which the controller 32 does not output the control signal to any other operation section.

When the operating lever 28A is placed at the hold position 28A1, the controller 32 outputs the control signal to the hold operation section 33A of the pilot pressure generation device 33. The pilot pressure generation device 33 does not output any of the pilot pressures Pb, Pc and Pd while the control signal is inputted to the hold operation section 33A.

Thus, the valve 16 shown in FIG. 3 turns to "hold position" with the first directional control valve 20 and the second directional control valve 21 each taking the hold position assigned to the neutral position (a). The switching of the valve 16 to the hold position stops the supply of the hydraulic oil from the main pump 11 to the hoist cylinder 10 and the discharge of hydraulic oil from the hoist cylinder 10 to the hydraulic oil reservoir 12. That is, with the valve 16 switched to "hold position", the hoist cylinder 10 is stopped from movement to be held, whereby the vessel 3 is stopped and held at the present position.

As shown in FIG. 4, when the operating lever 28A is operated from the hold position 28A1 to the rise side (in the arrow R direction), the controller 32 outputs the control signal to the rise operation section 33B of the pilot pressure generation device 33. The rise operation section 33B, when given the control signal inputted from the controller 32, outputs the pilot pressure Pb to the hydraulic pilot portion 20A of the first directional control valve 20 and the hydraulic pilot portion 21A of the second directional control valve 21 which are shown in FIG. 3. At this time, a pressure close to the reservoir pressure acts as the pilot pressure on the hydraulic pilot portion 20B of the first directional control valve 20 and the hydraulic pilot portion 21B of the second directional control valve 21.

Thus, the valve 16 turns to "rise position" with the first directional control valve 20 and the second directional control valve 21 each switched from the neutral position (a) to the rise position (b). With the switching of the second directional control valve 21 to the rise position (b), the pressurized oil discharged from the main pump 11 is supplied to the oil chamber A of the hoist cylinder 10 through the pump pipe conduit 13, the high-pressure side oil passage 17, the second directional control valve 21, the actuator-side oil passage 23A and the hydraulic pipe conduit 15A. With the switching of the first directional control valve 20 to the rise position (b), the hydraulic oil in the oil chamber B is discharged to the hydraulic oil reservoir 12 through the hydraulic pipe conduit 15B, the actuator-side oil passage 22B, the first directional control valve 20, the low-pressure side oil passage 18 and the reservoir pipe conduit 14. While the valve 16 is switched to "rise position", the piston rod 10C of the hoist cylinder 10 continues to extend and lifts up the front part side of the vessel 3, and thus, the vessel 3 is pivotally moved toward the dumping position (refer to FIG. 2). That is, the vessel 3 rises up.

As shown in FIG. 4, when the operating lever 28A is operated from the hold position 28A1 to the floating position 28A2, the controller 32 outputs the control signal to the floating operation section 33C of the pilot pressure generation device 33. With the control signal inputted from the controller 32, the floating operation section 33C outputs the pilot pressure Pc to the hydraulic pilot portion 20B of the first directional control valve 20 shown in FIG. 3. At this time, a pressure close to the reservoir pressure acts as the pilot pressure on the hydraulic pilot portion 20A of the first directional control valve 20 and the hydraulic pilot portions 21A, 21B of the second directional control valve 21.

Thus, the valve 16 turns to "floating position" with the first directional control valve 20 switched from the neutral position (a) to the floating position (c) and with the second directional control valve 21 switched to the neutral position (a). When the first directional control valve 20 is switched to the floating position (c), the actuator-side oil passage 22A is connected to the low-pressure side oil passage 18 and the reservoir pipe conduit 14 through the first directional control valve 20. Further, the actuator-side oil passage 22B is connected to the low-pressure side oil passage 18 and the reservoir pipe conduit 14 through the check valve 24B, and at the same time, the actuator-side oil passage 23B is connected to the low-pressure side oil passage 18 and the reservoir pipe conduit 14 through the check valve 26B. When the valve 16 is switched to "floating position", the hoist cylinder 10 contracts by virtue of the load (dead weight) of the vessel 3, and this causes the hydraulic oil in the oil chamber A to be discharged to the hydraulic oil reservoir 12 through the hydraulic pipe conduit 15A, the actuator-side oil passage 22A, the first directional control valve 20, the low-pressure side oil passage 18 and the reservoir pipe conduit 14. Further, the oil chamber B is replenished with the hydraulic oil in the hydraulic oil reservoir 12 from the check valves 24B, 26B through the actuator-side oil passages 22B, 23B and the hydraulic pipe conduit 15B. In short, with the valve 16 switched to "floating position", the vessel 3 is allowed to fall by virtue of its dead weight. Therefore, the vessel 3 pivotally moves (is tilted) downward to lower the front part side, so that the vessel 3 is seated on the vehicle frame 2 (refer to FIG. 1).

As shown in FIG. 4, when the operating lever 28A is operated from the floating position 28A2 toward the fall side (in the arrow L direction), the controller 32 outputs the control signal to the fall operation section 33D of the pilot pressure generation device 33. When given the control signal inputted from the controller 32, the fall operation section 33D outputs the pilot pressure Pd to the hydraulic pilot portion 21B of the second directional control valve 21 shown in FIG. 3. At this time, a pressure close to the reservoir pressure acts as the pilot pressure on the hydraulic pilot portion 21A of the second directional control valve 21 and the hydraulic pilot portions 20A, 20B of the first directional control valve 20.

Thus, the valve 16 turns to "fall position" with the first directional control valve 20 switched to the neutral position (a) and with the second directional control valve 21 switched from the neutral position (a) to the fall position (d). When the second directional control valve 21 is switched to the fall position (d), the hydraulic oil from the main pump 11 is supplied to the oil chamber B of the hoist cylinder 10 through the pump pipe conduit 13, the high-pressure side oil passage 17, the second directional control valve 21, the actuator-side oil passage 23B and the hydraulic pipe conduit 15B. Further, the hydraulic oil in the oil chamber A is discharged to the hydraulic oil reservoir 12 through the hydraulic pipe conduit 15A, the actuator-side oil passage 23A, the second directional control valve 21, the low-pressure side oil passage 18 and the reservoir pipe conduit 14. While the valve 16 is switched to "fall position", the hoist cylinder 10 causes the cylindrical inner tube portion 10B to contract together with the piston rod 10C into the cylindrical outer tube portion 10A due to the pressurized oil supplied in the oil chamber B. In short, the hoist cylinder 10 causes the vessel 3 to pivotally move (tilt) downward to lower the front part side of the vessel 3 by the hydraulic power, whereby the vessel 3 is seated on the vehicle frame 2 (refer to FIG. 1).

As shown in FIG. 4, the angle sensor 59 is provided at the connection portion of the vessel 3 with the vehicle frame 2 and detects the pivotal angle of the vessel 3 that pivotally moves about the connecting pin 5 serving as the pivotal fulcrum, to output a detection signal to the controller 32. The pivotal angle θ is set to become θmin when the vessel 3 is in the seated state of being at the transportation position, become larger in its value as the vessel 3 is pivotally moved toward the dumping position, and become θmax when the vessel 3 is positioned to the dumping position.

The stroke sensor 69 detects the stroke position S of the hoist cylinder 10 and outputs a detection signal to the controller 32. The stroke position S is set so that, for example, the value becomes Smin with the hoist cylinder 10 made to contract most, becomes larger with the extension of the hoist cylinder 10 and becomes Smax in the state that the hoist cylinder 10 extends to its extreme end.

Figure 5:
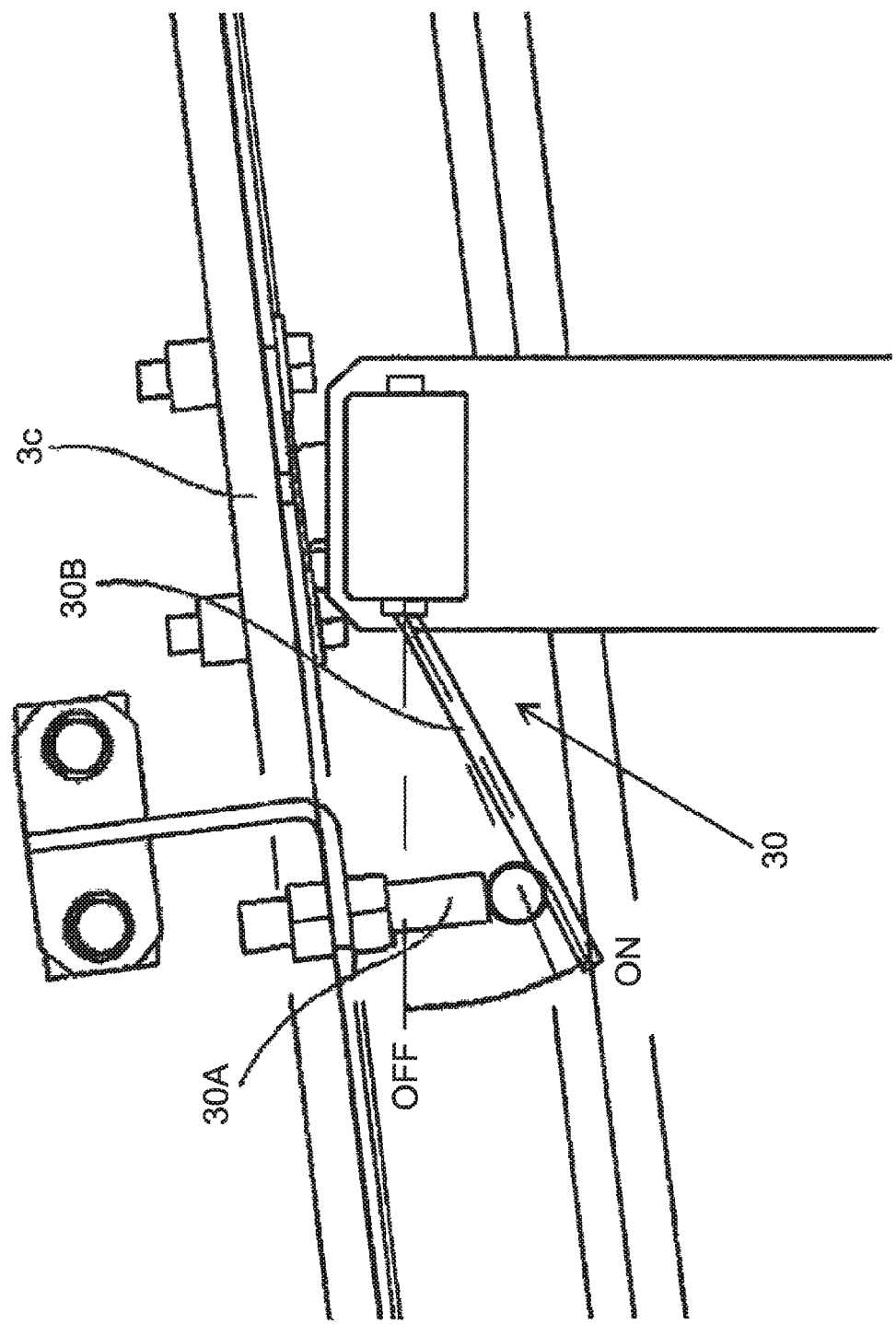
FIG. 5 is a side view showing the configuration of a seating sensor.

The seating sensor 30 detects whether the vessel 3 is seated on the vehicle frame 2 or not, and outputs a detection signal to the controller 32. As shown in FIG. 1 and FIG. 2, the seating sensor 30 is disposed on an upper part of the hydraulic oil reservoir 12. FIG. 5 is a side view showing the configuration of the seating sensor 30. As shown in FIG. 5, the seating sensor 30 is a touch-type sensor installed on the vehicle frame 2 side and is provided with a rod-like touch terminal 30B. At the bottom part 3c of the vessel 3, a protruding portion 30A is provided that is arranged to brought into contact with the touch terminal 30B when the vessel 3 is seated on the vehicle frame 2. When the protruding portion 30A being a target to be detected is in contact with the touch terminal 30B, the seating sensor 30 outputs an ON-signal to the controller 32. When the protruding portion 30A is separated from the touch terminal 30B not to effect the contact between the both members, the seating sensor 30 outputs an OFF-signal to the controller 32. In the present specification, outputting the OFF-signal means that the ON-signal (control current) is not outputted to the controller 32, and this encompasses outputting a control current differing from the ON-signal and not outputting the control current.

Figure 6:
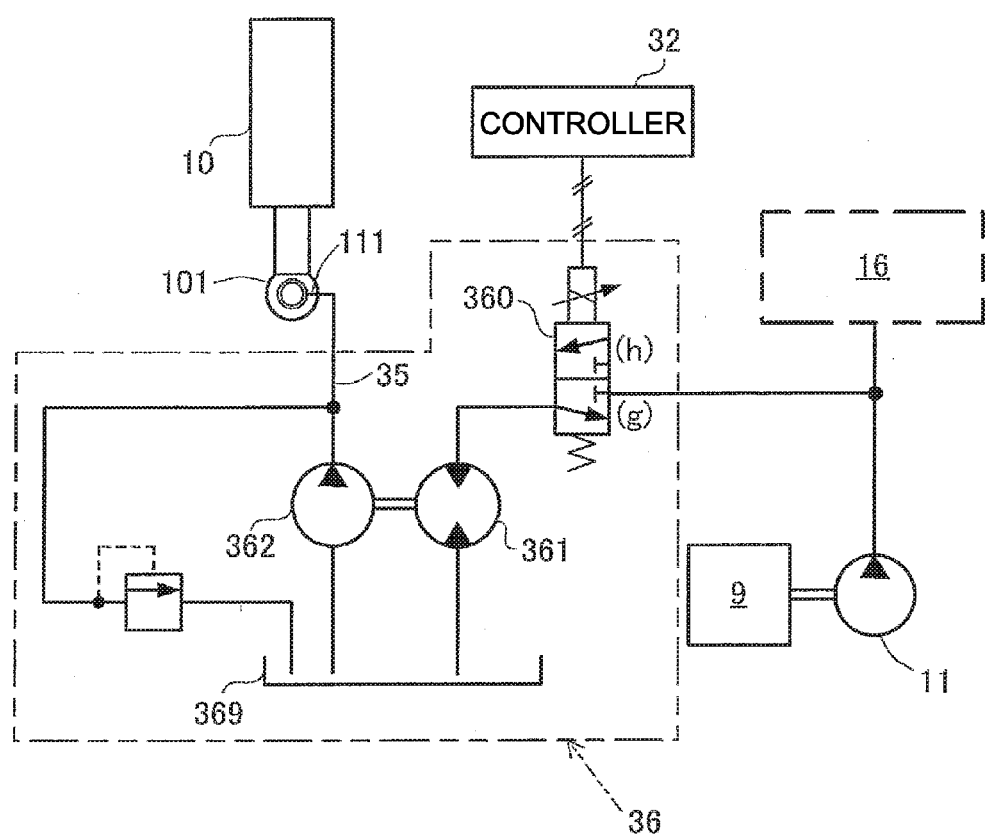
FIG. 6 is a circuit diagram showing a grease feed device.

FIG. 6 is a circuit diagram showing the configuration of the grease feed device 36. As shown in FIG. 6, the grease feed device 36 is provided with a grease feed control valve 360, a grease feed motor 361, a grease feed pump 362 and a grease feed reservoir 369 storing lubricant (lubrication oil) such as grease. The grease feed control valve 360 is an electromagnetic changeover valve that is switched between a closed position (g) and an open position (h) in response to a control signal (exciting current to a solenoid) outputted from the controller 32. When an ON-signal is outputted from the controller 32, the grease feed control valve 360 excites the solenoid to be switched to the open position (h). When an OFF-signal is outputted from the controller 32, the grease feed control valve 360 demagnetizes the solenoid to be switched by a spring force to the closed position (g).

The grease feed motor 361 is a hydraulic motor for lubricant supply that is driven by the pressurized oil discharged from the main pump 11. The grease feed motor 361 is coupled at its rotational shaft to a rotational shaft of the grease feed pump 362. The grease feed pump 362 discharges lubricant stored in the grease feed reservoir 369 when rotationally driven by the grease feed motor 361. A discharge side of the grease feed pump 362 is connected through a grease feed hose 35 to a grease feed hole 111 in the rod head 101 of the hoist cylinder 10.

When the grease feed control valve 360 is switched to the open position (h), the grease feed motor 361 is driven by the pressurized oil discharged from the main pump 11. The driving of the grease feed motor 361 effects the driving of the grease feed pump 362, whereby lubricant discharged from the grease feed pump 362 is supplied to the rod head 101 of the hoist cylinder 10 through the grease feed hose 35. When the grease feed control valve 360 is switched to the closed position (g), the rotation of the grease feed pump 362 is stopped, whereby the supply of the lubricant to the rod head 101 is discontinued.

Figure 7A:
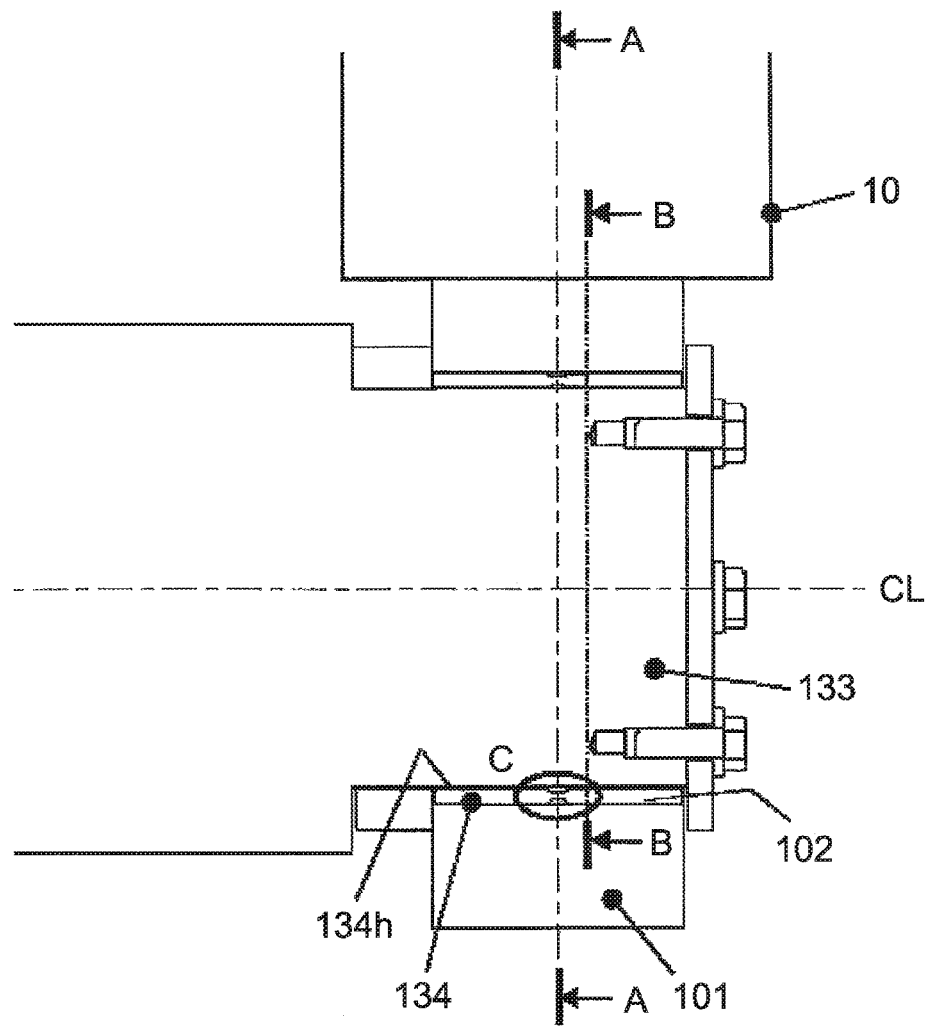
FIG. 7A is a schematic longitudinal-sectional view of a connection portion between the hoist cylinder and the hoist shaft, taken along an imaginary plane parallel to the axis of the hoist shaft.
Figure 7B:
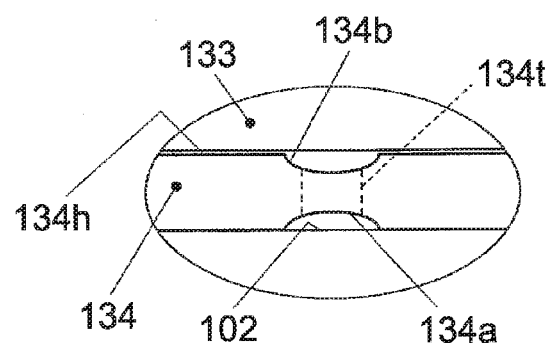
FIG. 7B is a fragmentary enlarged view of a portion C in FIG. 7A.

The details of the connection portion between the hoist cylinder 10 and the hoist shaft 133 will be described with reference to FIG. 7A to FIG. 9. FIG. 7A is a schematic longitudinal-sectional view of the connection portion between the hoist cylinder 10 and the hoist shaft 133, taken along an imaginary plane parallel to the center axis CL of the hoist shaft 133. FIG. 7B is a fragmentary enlarged view of a portion C in FIG. 7A. As mentioned earlier, the rod head 101 of the hoist cylinder 10 is provided with the bore 102 into which the cylindrical bushing 134 is press-fitted. The bushing 134 is provided with the cylindrical through bore 134h that enables the hoist shaft 133 to pass through. The hoist shaft 133 is inserted into the through bore 134h of the bushing 134, which connects the hoist cylinder 10 with the vehicle frame 2. Sliding is enabled between the internal surface of the bushing 134 and the surface of the hoist shaft 133, so that the hoist cylinder 10 is pivotable about the hoist shaft 133 serving as the pivotal fulcrum.

Figure 8:
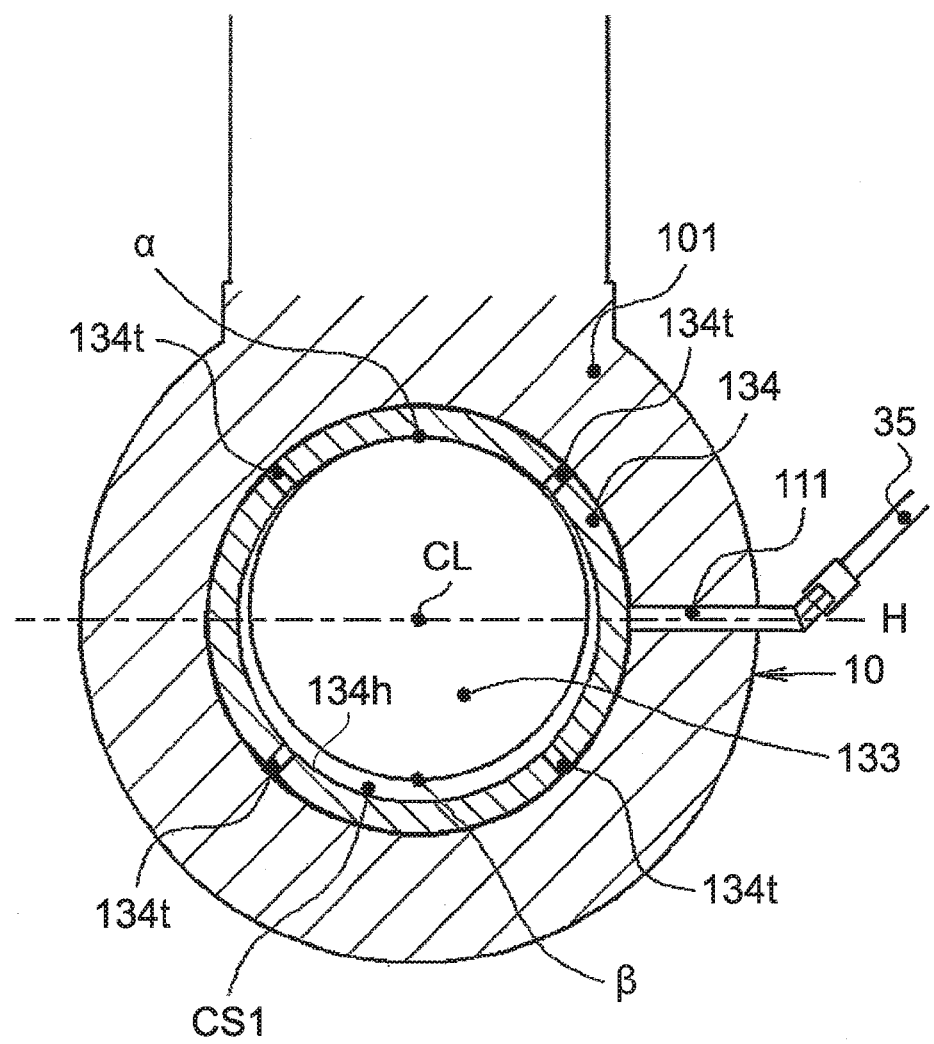
FIG. 8 is a fragmentary cross-sectional view showing the positional relation between a bushing and the hoist shaft in the state that the vessel is seated on a vehicle and that a valve is operated in a float position.
Figure 9:
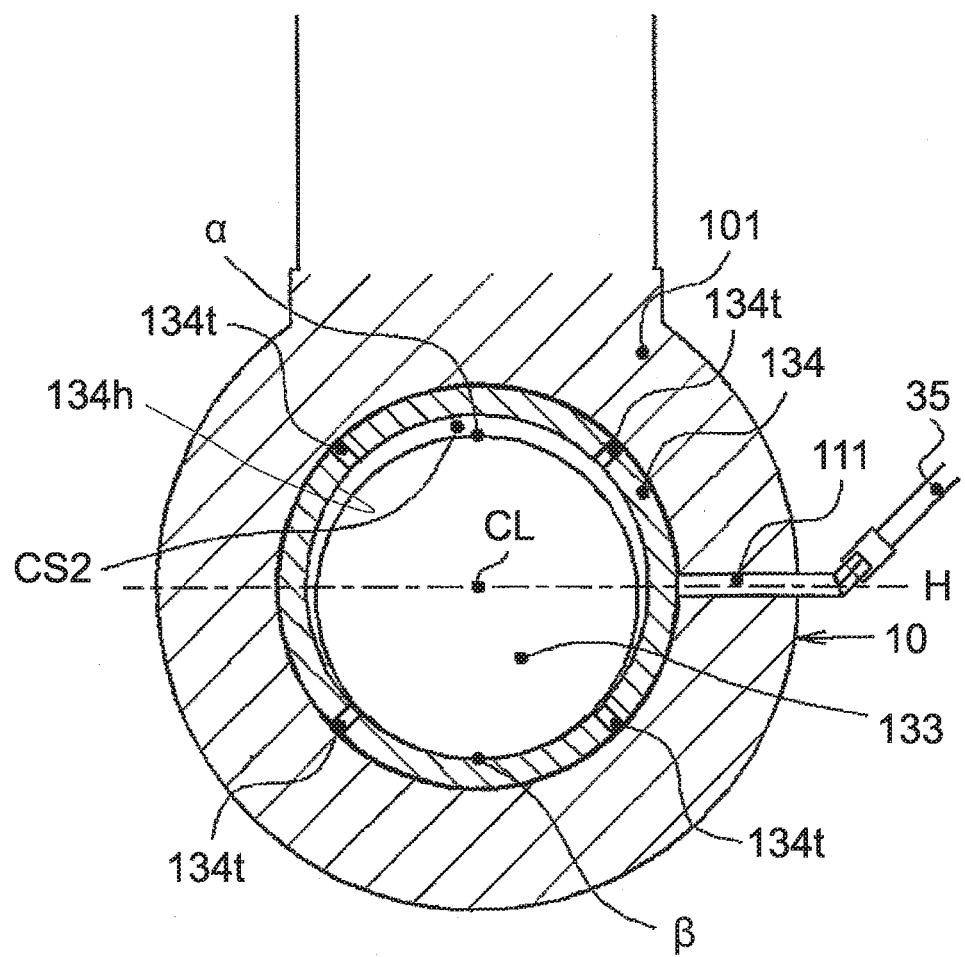
FIG. 9 is another fragmentary cross-sectional view showing the positional relation between the bushing and the hoist shaft in the state that the hoist cylinder is made to contract by a predetermined amount from the state shown in FIG. 8.

FIG. 8 and FIG. 9 are each a fragmentary cross-sectional view of the connection portion between the hoist cylinder 10 and the hoist shaft 133, taken along an imaginary plane (A-A plane in FIG. 7A) perpendicular to the center axis CL of the hoist shaft 133. For the convenience in description, a clearance between the surface of the hoist shaft 133 and the internal surface of the through bore 134h of the bushing 134 is illustrated in an exaggerated scale. FIG. 8 shows the positional relation between the bushing 134 and the hoist shaft 133 in the state that the vessel 3 is seated on the vehicle frame 2 and that the valve 16 is placed at the floating position. FIG. 9 shows the positional relation between the bushing 134 and the hoist shaft 133 in the state that the hoist cylinder 10 is made to contract by a predetermined amount from the state shown in FIG. 8.

As shown in FIG. 8 and FIG. 9, the hoist cylinder 10 is provided with the grease feed hole 111 being a through hole for grease feed. The grease feed hole 111 is connected to the grease feed hose 35. As mentioned before, the grease feed hose 35 is connected at one end to the grease feed hole 111 and at the other end to the discharge side of the grease feed pump 362 of the grease feed device 36 (refer to FIG. 6).

As shown in FIG. 7B, a groove (hereafter noted as an outer circumferential groove 134a) that leads lubricant supplied from the grease feed device 36 is provided on the surface of the bushing 134 in the circumferential direction. A plurality (four in the example shown in FIG. 8 and FIG. 9) of communication holes 134t that make a gap in the outer circumferential groove 134a communicate with a clearance between the surface of the hoist shaft 133 and the internal surface of the through bore 134h of the bushing 134 are provided in the outer circumferential groove 134a at equiangular intervals.

On the internal surface of the bushing 134 on the opposite side of the outer circumferential groove 134a, there is provided in the circumferential direction a groove (hereafter noted as an inner circumferential groove 134b) that leads the lubricant introduced from the outer circumferential groove 134a through the plurality of the communication holes 134t to the whole circumference between the surface of the hoist shaft 133 and the internal surface of the through bore 134h of the bushing 134.

In the haulage vehicle, it is conventional that the valve 16 is switched to the floating position to let the vessel 3 to be seated on the vehicle frame 2 by virtue of the dead weight. Further, it is also conventional that also during the traveling of the vehicle, the valve 16 is held to remain at the floating position to keep the contraction state of the hoist cylinder 10 by making use of the dead weight of the hoist cylinder 10. As shown in FIG. 1, where the valve 16 has been switched to the floating position with the vessel 3 seated on the vehicle frame 2, the dead weight of the hoist cylinder 10 is supported by the hoist shaft 133, as shown in FIG. 8. Thus, a surface upper part α of the hoist shaft 133 comes to close contact with the internal surface upper part of the through bore 134h of the bushing 134. Incidentally, similarly to this, when the hoist shaft 133 supports the load of the vessel 3 as shown in FIG. 2, the surface upper part α of the hoist shaft 133 is in close contact with the internal surface upper part of the through bore 134h of the bushing 134. When the hoist shaft 133 and the bushing 134 are in close contact at the upper parts thereof, a clearance CS1 is formed between a surface lower part β of the hoist shaft 133 and an internal surface lower part of the through bore 134h of the bushing 134.

Like this, in the haulage vehicle, the hoist shaft 133 and the bushing 134 are in close contact at the upper parts thereof during the dumping work and the traveling as shown in FIG. 8. Accordingly, even when lubricant is supplied between the hoist shaft 133 and the bushing 134, it is unable for the lubricant to permeate satisfactorily into the close-contact portion at the upper parts. As a result, the progress of abrasion of the bushing 134 at the upper close-contact portion becomes faster than other portions (for example, the internal surface lower part of the bushing 134). Because it becomes necessary to replace the bushing 134 when the same reaches the limit of abrasion even partly, it is undesirable that abrasion being uneven or not uniform from those at other potions proceeds at the close-contact portion. Therefore, in the present embodiment, the hoist cylinder 10 is made to contract slightly with the vessel 3 seated on the vehicle frame 2, and lubricant is supplied in the state that as shown in FIG. 9, a clearance CS2 is formed between the surface upper part α of the hoist shaft 133 and the internal surface upper part of the through bore 134h of the bushing 134. Hereafter, description will be made regarding the details of a lubricant supply control (i.e., the contract control of the hoist cylinder 10 and the driving control of the grease feed device 36) by the controller 32.

As shown in FIG. 4, the controller 32 executes the lubricant supply control in accordance with a lubricant supply control program stored in the storage section 32A. The controller 32 is provided as functions thereof with an operation judgment section 320, a seating judgment section 321, a valve control section (lubricant supply control section) 322 and a grease feed control section (lubricant supply control section) 323.

The operation judgment section 320 judges based on information on the pivotal angle of the vessel 3 detected by the angle sensor 59 whether or not, the vessel 3 is pivoting from the dumping position side in the direction toward the transportation position, that is, whether or not, the vessel 3 is being operated to fall. When the pivotal angle θ decreases, the operation judgment section 320 judges that the fall operation of the vessel 3 is being performed. Incidentally, that the fall operation of the vessel 3 is being performed means the operation being in a non-seated state that the vessel 3 is not seated on the vehicle frame 2, and thus, the judgment whether the vessel 3 is being operated to fall or not corresponds to making a judgment whether to be in the non-seated state or not.

When the vessel 3 is judged to be in a fall operation, the seating judgment section 321 judges based on the signal from the seating sensor 30 whether the vessels 3 is seated or not. When given the ON-signal inputted from the seating sensor 30, the seating judgment section 321 judges that the vessel 3 is seated, that is, the vessel 3 is at the transportation position. When given the OFF-signal outputted from the seating sensor 30, the seating judgment section 321 judges that the vessel 3 is not seated, that is, the vessel 3 is not at the transportation position.

When the vessel 3 is judged to be seated, the valve control section 322 outputs a control signal to the fall operation section 33D of the pilot pressure generation device 33 to switch the second directional control valve 21 of the valve 16 to the fall position (d), and this causes the hoist cylinder 10 to contract until the stroke position S of the hoist cylinder 10 becomes a threshold value S0. When the stroke position S detected by the stroke sensor 69 becomes equal to or less than the threshold value S0, the valve control section 322 outputs a control signal to the hold operation section 33A of the pilot pressure generation device 33 to switch the first directional control valve 20 and the second directional control valve 21 of the valve 16 to the neutral position (a), whereby the hoist cylinder 10 discontinues the operation to keep the contraction state. Incidentally, the threshold value S0 designates the stroke position S that the hoist cylinder 10 has when the vessel 3 is seated on the vehicle frame 2 and when as shown in FIG. 9, the surface lower part β of the hoist shaft 133 contacts the internal surface lower part of the bushing 134 of the rod head 101, and is stored beforehand in the storage section 32A of the controller 32 (Smin≤S0≤Smax).

When the vessel 3 is judged to be seated, the grease feed control section 323 outputs the ON-signal to the grease feed control valve 360 of the grease feed device 36 to switch the grease feed control valve 360 to the open position (h) and drives the grease feed device 36 until the driving period of time (i.e., greasing period of time) of the grease feed device 36 becomes a time threshold value t0 or longer. The time threshold value t0 is stored beforehand in the storage section 32A of the controller 32. The grease feed control section 323 judges whether the state that the grease feed pump 362 is supplying lubricant to the hoist cylinder 10 has been continued for the period of the time threshold value t0 or longer. If the grease feed time t counted by a timer built in the controller 32 becomes the time threshold value t0 or longer, the grease feed control section 323 judges that a grease feed end condition is satisfied, and outputs the OFF-signal to the grease feed control valve 360, whereby the grease feed control valve 360 is switched to the closed position (g) to stop the grease feed device 36.

After the supply of lubricant by the grease feed device 36 is discontinued upon satisfaction of the grease feed end condition, the valve control section 322 outputs the control signal to the floating operation section 33C of the pilot pressure generation device 33 to switch the first directional control valve 20 of the valve 16 to the floating position (c).

FIG. 10 is a flowchart showing the processing details of the lubricant supply control by the controller 32 according to the present embodiment. The processing shown in this flowchart is started for example by turning a starter switch (i.e., ignition switch, not shown) to ON and is repetitively executed in a predetermined control cycle after the execution of an initial setting (not shown). Although not shown, the controller 32 is designed to acquire information from various sensors such as the seating sensor 30, the angle sensor 59, the lever sensor 29, the stroke sensor 69 and the like on a predetermined control cycle.

At step S110, the controller 32 judges based on the signal from the angle sensor 59 whether the vessel 3 is being operated to fall or not. The step S110 is repeated until an affirmative judgment is made, and the processing proceeds to step S120 when the affirmative judgment is made. At step 120, the controller 32 sets to 0 (zero) a grease feed period of time t that is counted by a timer built in the controller 32, that is, initializes the grease feed period of time t (i.e., resets the timer) and then, advances the processing to step 130.

At step S130, the controller 32 judges based on the signal from the seating sensor 30 whether the vessel 3 is seated on the vehicle frame 2 or not. The step S130 is repeated until an affirmative judgment is made, and the processing proceeds to step S140 when the affirmative judgment is made. When the affirmative judgment is made at step S130, the controller 32 judges that the vessel 3 has turned from the non-seated state in which the vessel 3 is not seated on the vehicle frame 2 to the seated state in which it is seated, and then executes the lubricant supply control (steps S140 through S170).

At step S140, the controller 32 outputs a control signal to the fall operation section 33D (refer to FIG. 4) of the pilot pressure generation device 33 and proceeds to step S143. Thus, the pilot pressure Pd is outputted from the pilot pressure generation device 33 to the hydraulic pilot portion 21B of the second directional control valve 21 of the valve 16, and thus, the second directional control valve 21 is switched to the fall position (d) (refer to FIG. 3). At this time, a pressure close to the reservoir pressure acts on the hydraulic pilot portions 20A, 20B of the first directional control valve 20, and thus, the first directional control valve 20 is held switched to the neutral position (a).

At step S143, the controller 32 judges whether the stroke position S is equal to or less than the threshold value S0 or not. An affirmative judgment at step S143 results in going to step S147, while a negative judgment at step S143 results in returning to step S140.

At step S147, the controller 32 outputs a control signal to the hold operation section 33A (refer to FIG. 4) of the pilot pressure generation device 33 and proceeds to step S150. Thus, the pressure acting on the hydraulic pilot portions 21A, 21B of the second directional control valve 21 goes down to a pressure close to the reservoir pressure, so that the second directional control valve 21 is switched to the neutral position (a) (refer to FIG. 3).

At step S150, the controller 32 outputs the ON-signal to the grease feed control valve 360 to switch the same to the open position (h) (refer to FIG. 6) and then proceeds to step S153. At step S153, the controller 32 executes a time counter increment processing (t=t+ΔL) in which the time ΔL representing the control cycle is added to the grease feed period of time t of the built-in timer, and then proceeds to step S157.

At step S157, the controller 32 judges whether the grease feed period of time t has become equal to or longer than the time threshold value t0 or not. An affirmative judgment at step S157 results in going to step S160, while a negative judgment at step S157 results in returning to step S150.

At step S160, the controller 32 outputs the OFF-signal to the grease feed control valve 360 (i.e., discontinues the outputting of the ON-signal (i.e., exciting current)) to switch the grease feed control valve 360 to the closed position (g) (refer to FIG. 6) and then proceeds to step S170.

At step S170, the controller 32 outputs a control signal to the floating operation section 33C (refer to FIG. 4) of the pilot pressure generation device 33 and terminates the processing shown as the flowchart in FIG. 10. Thus, the pilot pressure Pc is outputted from the pilot pressure generation device 33 to the hydraulic pilot portion 20B of the first directional control valve 20 of the valve 16, whereby the first directional control valve 20 is switched to the floating position (c) (refer to FIG. 3).

The operation in the present embodiment will be summarized as follows:

As shown in FIG. 1, the operator operates the dump truck 1 to transport the crushed rocks 4 loaded on the vessel 3 to a designated place. As shown in FIG. 2, the operator operates the operating lever 28A to the operation position on the rise side, whereby the vessel 3 is tilted to dump the crushed rocks 4. Upon completion of the dumping, the operator operates the operating lever 28A to the floating position 28A2 (refer to FIG. 4) to let the vessel 3 operate to fall by virtue of the dead weight.

The vessel 3 falls by virtue of its dead (empty) weight about the connecting pin 5 acting as the pivotal fulcrum, and when the vessel 3 is moved from the non-seated state in which the protruding portion 30A provided as a target for detection on the vessel 3 side is spaced from the seating sensor 30, to the seated state in which the protruding portion 30A is in contact with the touch terminal 30B (refer to FIG. 5) of the seating sensor 30, the lubricant supply control is executed by the controller 32. In the lubricant supply control, a switching control is executed to switch the switching position of the pilot pressure generation device 33 to the fall position (from Yes at step S110 through Yes at step S130 to step S140).

Therefore, the hoist cylinder 10 contracts further than it does in the usual seated state with the valve 16 having been switched to the floating position. When the hoist cylinder 10 contracts to have the stroke position S equal to or less than the threshold value S0, the contract operation of the hoist cylinder 10 is discontinued, and the same is held at the discontinued position (from Yes at step S143 to step S147). At this time, as shown in FIG. 9, the surface lower part β of the hoist shaft 133 and the internal surface lower part of the through bore 134h of the bushing 134 contact each other at a predetermined contact pressure, so that the clearance CS2 is formed between the internal surface upper part of the through bore 134h of the bushing 134 and the surface upper part α of the hoist shaft 133.

In this state, lubricant is supplied from the grease feed device 36 through the grease feed hose 35 to the grease supply hole 111 of the rod head 101 (from step S150 through step S153 to No at step S157). The lubricant supplied to the rod head 101 is filled up in the outer circumferential groove 134a of the bushing 134 shown in FIG. 7B and is supplied to the clearance CS2 through the communication holes 134t extending radially inward from the outer circumferential groove 134a. The lubricant supplied to the clearance CS2 permeates into the whole circumference of the hoist shaft 133 through the inner circumferential groove 134b. As a result, lubrication is given over the surface of the hoist shaft 133 and the internal surface of the through bore 134h of the bushing 134.

The grease feed device 36 is automatically stopped after being operated for a predetermined period of time (from Yes at step S157 to step S160). Further, a switching control is performed to switch the switching position of the valve 16 to the floating position, whereby a reaction force accumulated at the contact portion between the vessel 3 and the vehicle frame 2 causes the hoist cylinder 10 to extend to a usual stroke position S=S1 (Smin S0≤S1≤Smax) (step S170). Thus, as shown in FIG. 8, the surface upper part α of the hoist shaft 133 contacts the internal surface upper part of the through bore 134h of the bushing 134 at a predetermined contact pressure, whereby the clearance CS1 is formed between the internal surface lower part of the through bore 134h of the bushing 134 and the surface lower part β of the hoist shaft 133.

As described above, the present embodiment is applied to the dump truck 1 having the vessel 3 provided pivotably relative to the vehicle frame 2, the hoist cylinder 10 telescopically provided between the vessel 3 and the vehicle frame 2, the main pump 11 for supplying hydraulic oil to the hoist cylinder 10, and the valve 16 provided between the main pump 11 and the hoist cylinder 10 for controlling the flow of hydraulic oil supplied to the hoist cylinder 10.

According to the present embodiment like this, advantageous effects can be accomplished as follows:

(1) The hoist shaft 133 provided in the vehicle frame 2 is mounted with itself passing through the through bore 134h of the bushing 134 provided at one end portion of the hoist cylinder 10. When the seating sensor 30 detects the vessel 3 seated on the vehicle frame 2, the controller 32 controls the valve 16 to make the hoist cylinder 10 contract and also controls the grease feed device 36 to supply lubricant to the clearance between the surface of the hoist shaft 133 and the internal surface of the through bore 134h of the bushing 134.

Thus, since the hoist cylinder 10 contracts further than it does in the usual seated state with the valve 16 switched to the floating position, the clearance CS2 is formed between the surface upper part α of the hoist shaft 133 and the internal surface upper part of the through bore 134h of the bushing 134 which have been held in close contact until then. In the present embodiment, the hoist cylinder 10 is made to contract until the close contact is made between the surface lower part β of the hoist shaft 133 and the internal surface lower part of the through bore 134h of the bushing 134, so that the clearance CS2 at the upper part is made to be large. Thus, as shown in FIG. 9, the volume of the clearance on the upper side of the imaginary horizontal plane H encompassing the center axis CL of the hoist shaft 133 is made to be larger than that on the lower side of the imaginary horizontal plane H.

Lubricant is supplied in the state that the clearance CS2 at the upper part is formed, and thus, the surface upper part α of the hoist shaft 133 and the internal surface upper part of the through bore 134h of the bushing 134 can be lubricated satisfactorily, so that the upper parts of the bushing 134 and the hoist shaft 133 can be restrained from abrading. As a result, an uneven abrasion of the bushing 134 and the hoist shaft 133 can be restrained, and hence, it is possible to improve the service lives of the bushing 134 and the hoist shaft 133.

(2) When judging that movement progresses from the non-seated state that the vessel 3 is not seated on the vehicle frame 2 to the seated state that it is seated thereon, the controller 32 controls the valve 16 to make the hoist cylinder 10 contract and also controls the grease feed device 36 to supply the clearance CS2 with lubricant. Because the lubricant supply control for the hoist cylinder 10 is executed to come upon the completion of the dumping work, an unpleasant feeling that might be given to the operator can be decreased in comparison with the case that the lubricant supply control is executed during the traveling.

(3) After controlling the grease feed device 36 to supply lubricant to the clearance CS2, the controller 32 switches the valve 16 to the floating position (the usual seated position). In the grease feeding, the hoist cylinder 10 is made to contract, and this makes it possible to reduce the period of time in the state that the surface lower part β of the hoist shaft 133 is held in contact with the internal surface lower part of the bushing 134, that is, in the state that a load is applied to the hoist cylinder 10. Thus, the hoist cylinder 10 is improved in service life. Further, when the valve 16 is switched to the floating position, the clearance CS1 is formed as shown in FIG. 8 between the surface lower part R of the hoist shaft 133 and the internal surface lower part of the through bore 134h of the bushing 134. Thus, the lubricant flows by virtue of its gravity and can satisfactorily lubricates the surface lower part β of the hoist shaft 133 and the internal surface lower part of the through bore 134h of the bushing 134, so that the lower parts of the bushing 134 and the hoist shaft 133 can be restrained from abrading.

(4) The outer circumferential groove 134a that leads the lubricant supplied from the grease feed device 36 is provided in the circumferential direction over the whole circumference of the surface of the bushing 134 being a cylindrical member. The outer circumferential groove 134a has the plurality of communication holes 134t opening therein, and the lubricant supplied to the outer circumferential groove 134a is led through the communication holes 134t to the clearance CS2 between the internal surface of the bushing 134 and the surface of the hoist shaft 133. Thus, during the lubricant supply control, it is possible to supply lubricant smoothly between the hoist shaft 133 and the bushing 134.

The following modified forms are also within the scope of the present invention, and it is also possible to combine one or some of the modified forms with the foregoing embodiment.

(Modified Form 1)

Although in the foregoing embodiment, description has been made about the example that uses the touch type sensor as the seating sensor 30, the present invention is not limited to this. The angle sensor 59 that detects the pivotal angle θ of the vessel 3 using the connecting pin 5 as the pivotal fulcrum may be used as the seating sensor 30. In this case, the controller 32 judges that the vessel 3 is seated on the vehicle frame 2 when the pivotal angle θ of the vessel 3 detected by the angle sensor 59 becomes equal to or less than the angle threshold value θ0. The angle threshold value θ0 is determined as a pivotal angle which is made by adding a tolerance (e.g., one degree or so) to the angle θmin that the vessel 3 has when seated, and is stored beforehand in the storage section 32A of the controller 32.

(Modified Form 2)

In the foregoing embodiment, description has been made regarding the example wherein when movement progresses from the non-seated state of the vessel 3 being not seated on the vehicle frame 2 to the seated state of the vessel 3 being seated thereon, the valve 16 makes the hoist cylinder 10 contract and the grease feed device 36 supplies lubricant to the clearance CS2 between the hoist shaft 133 and the bushing 134. However, the present invention is not limited to this example.

(Modified Form 2-1)

For example, each time a predetermined period of time elapses in the seated state of the vessel 3 being seated on the vehicle frame 2, the controller 32 may control the valve 16 to make the hoist cylinder 10 contract and may control the grease feed device 36 to supply lubricant to the clearance CS2 between the hoist shaft 133 and the bushing 134. By supplying lubricant at regular intervals, it is possible to lubricate the surface of the hoist shaft 133 and the internal surface of the through bore 134h of the bushing 134.

(Modified Form 2-2)

A grease feed switch (not shown) may be provided in the cab 6, in which case the lubricant supply control may be executed when the grease feed switch is operated in the state that the vessel 3 is judged to be in the seated state with itself being seated on the vehicle frame 2.

(Modified Form 3)

In the foregoing embodiment, description has been made regarding the example wherein the threshold value S0 of the stroke position S is used as the stroke position S that the rod head 101 takes at a position where the surface lower part β of the hoist shaft 133 and the internal surface lower part of the bushing 134 in the rod head 101 contact each other. However, the present invention is not limited to this example. The threshold value S0 may be such a stroke position S that can provide a clearance at least between the surface upper part α of the hoist shaft 133 and the internal surface upper part of the bushing 134. For example, a stroke position S at which the center axis CL of the hoist shaft 133 becomes concentric with the center axis of the bore 102 of the rod head 101 may be stored as the threshold value S0 in the storage section 32A. Incidentally, it is preferable that the storage section 32A beforehand stores as the threshold value S0 such a stroke position S that makes the height dimension of the upper clearance CS2 between the hoist shaft 133 and the bushing 134 longer than the height dimension of the lower clearance CS1.

(Modified Form 4)

In the foregoing embodiment, description has been made regarding the example wherein the operation judgment section 320 judges based on the detection signal from the angle sensor 59 whether the vessel 3 is being operated to fall or not. However, the present invention is not limited to this example. The operation judgment section 320 may judge based on the detection signal from the lever sensor 29 whether the operating lever 28A has been operated from the state of being operated to the operation position on the rise side or the hold position to the operation position on the fall side or to the floating position, and when an affirmative judgment is made, may judge that the vessel 3 is being operated to fall, that is, the vessel 3 is in the non-seated state.

(Modified Form 5)

In the foregoing embodiment, description has been made regarding the example wherein the judgment of whether the vessel 3 is in the non-seated state or not is made in dependence on whether the vessel 3 is being operated to fall or not. However, the present invention is not limited to this example. The controller 32 may judge based on the detection signal from the seating sensor 30 whether the vessel 3 is in the non-seated state or not. In the present modified form, when the vessel 3 is judged to be in the seated state following the judgment of the vessel 3 being in the non-seated state, the controller 32 may judge that the vessel 3 has proceeded from the non-seated state to the seated state.

(Modified Form 6)

Before step S110 in FIG. 10, there may be added a floating position operation judgment step of judging whether the operating lever 28A is being operated to the floating position 28A2 or not. This floating position operation judgment step is repeated until an affirmative judgment is made, and when the operating lever 28A is judged to have been operated to the floating position 28A2 (in the case of the affirmative judgment), the processing proceeds to step S110.

(Modified Form 7)

Although the dump truck 1 that supports the vessel 3 on the vehicle frame 2 of the wheel type having the front wheels 7 and the rear wheels 8 has been described by way of example in the foregoing embodiment, the present invention is not limited to the dump truck 1. For example, the present invention is also applicable to a haulage vehicle such as a crawler carrier which mounts a vessel on a vehicle provided with a crawler-type traveling mechanism.

Although various embodiments and modified forms have been described as above, the present invention is not limited to these embodiment and modified forms. It to be noted that other forms conceivable within the technical concept of the present invention may be encompassed in the scope of the present invention.

What is claimed is:

1. A haulage vehicle having a vessel pivotably provided relative to the vehicle, a hoist cylinder provided telescopically between the vessel and the vehicle, a hydraulic power source that supplies the hoist cylinder with hydraulic oil, and a valve provided between the hydraulic power source and the hoist cylinder for controlling the flow of hydraulic oil supplied to the hoist cylinder, the haulage vehicle comprising:

a bushing provided at one end portion of the hoist cylinder;

a hoist shaft provided in the vehicle and mounted in a through bore of the bushing;

a lubricant supplier that supplies lubricant to a clearance between a surface of the hoist shaft and an internal surface of the through bore of the bushing;

a seating detection device that detects whether the vessel is seated on the vehicle or not; and a controller that when the vessel is seated on the vehicle, controls the valve to make the hoist cylinder contract and also controls the lubricant supplier to supply lubricant to the clearance.

2. The haulage vehicle according to claim 1, wherein the controller is provided with:

a seating judgment section for judging that the vessel has proceeded from a non-seated state of the vessel being not seated on the vehicle to a seated state of the vessel being seated on the vehicle; and a lubricant supply control section that when a movement from the non-seated state to the seated state is judged by the seating judgment section, controls the valve to make the hoist cylinder contract and then controls the lubricant supplier to supply lubricant to the clearance.

3. The haulage vehicle according to claim 1, wherein the controller is provided with a lubricant supply control section that each time a predetermined period of time elapses with the vessel seated on the vehicle, controls the valve to make the hoist cylinder contract and then controls the lubricant supplier to supply lubricant to the clearance.

4. The haulage vehicle according to claim 1, wherein:

the valve has a plurality of switching positions including a rise position in which the hoist cylinder is extended through a supply and discharge of hydraulic oil to lift up the vessel, a fall position in which the hoist cylinder is made to contract through the supply and discharge of hydraulic oil to pivotally move the vessel downward, a floating position in which the vessel is allowed to fall by its gravity, and a hold position in which the movement of the hoist cylinder is discontinued by stopping the supply and discharge of hydraulic oil; and the controller is provided with a valve control section that switches the switching position of the valve to the floating position after the lubricant supplier supplies lubricant to the clearance.

5. The haulage vehicle according to claim 1, wherein the bushing is a cylindrical member, and is provided with:

a groove that is provided on a surface of the bushing in a circumferential direction for leading the lubricant supplied from the lubricant supplier; and a hole provided in the groove for leading the lubricant supplied to the groove to the clearance.

* * * * *